United States Patent [19]

Strickland

[11] Patent Number: 4,584,717

[45] Date of Patent: Apr. 22, 1986

[54] COVER FOR AN AUTOMOBILE RADIO ASSEMBLY

[76] Inventor: Joe D. Strickland, 1177 Malone Rd., San Jose, Calif. 95125

[21] Appl. No.: 634,676

[22] Filed: Jul. 30, 1984

Related U.S. Application Data

[63] Continuation of Ser. No. 363,600, Mar. 30, 1982, abandoned.

[51] Int. Cl.$^4$ .......................... H04B 1/08; G11B 1/00
[52] U.S. Cl. ..................................... 455/345; 360/137; 369/11; 455/347
[58] Field of Search ............... 455/345, 347, 351, 348, 455/344; 360/137; 369/11; 248/313, 223.4, 224.4; 220/62, 352; 206/387

[56] References Cited

U.S. PATENT DOCUMENTS 3,866,751  2/1975  Holert ................................ 206/387
4,365,280  12/1982  Crosetti et al. ...................... 455/345

Primary Examiner—Marc E. Bookbinder
Attorney, Agent, or Firm—Burns, Doane, Swecker & Mathis

[57] ABSTRACT

The present invention relates to a closure of relatively rigid material adapted to fit over the visible portion of an auto radio assembly on a dashboard, or at least over the portion thereof enclosing the tape deck, and to lock in place in such tight relationship with the dashboard or area where the radio is mounted so as to conceal the radio, and particularly the tape deck, so that on relatively close inspection a thief would observe no more than a blank panel resembling that used when there is no radio in the vehicle.

1 Claim, 6 Drawing Figures

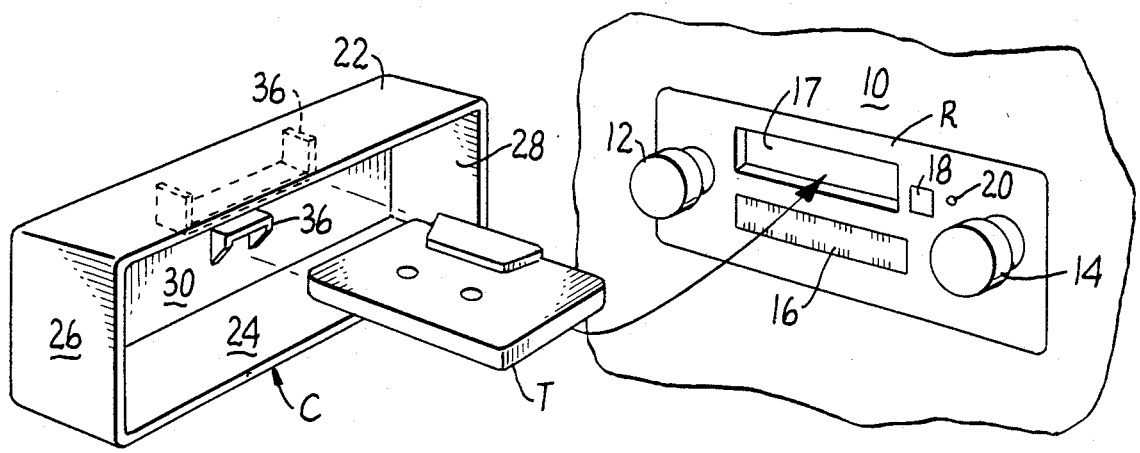
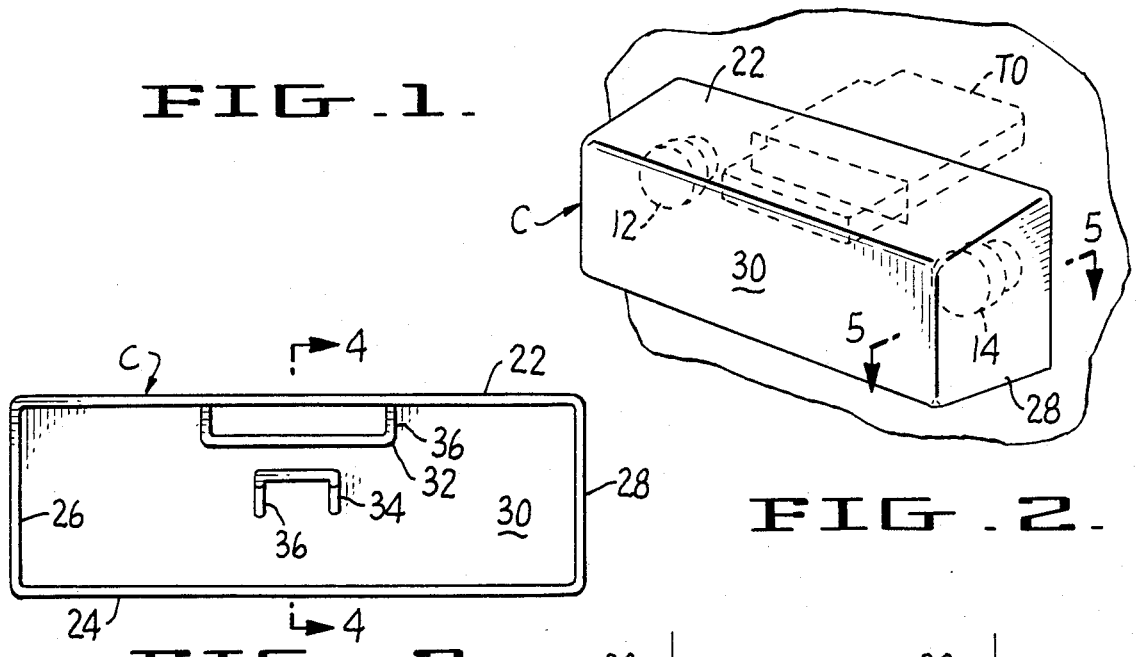
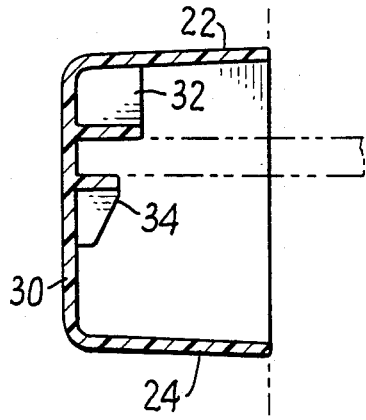
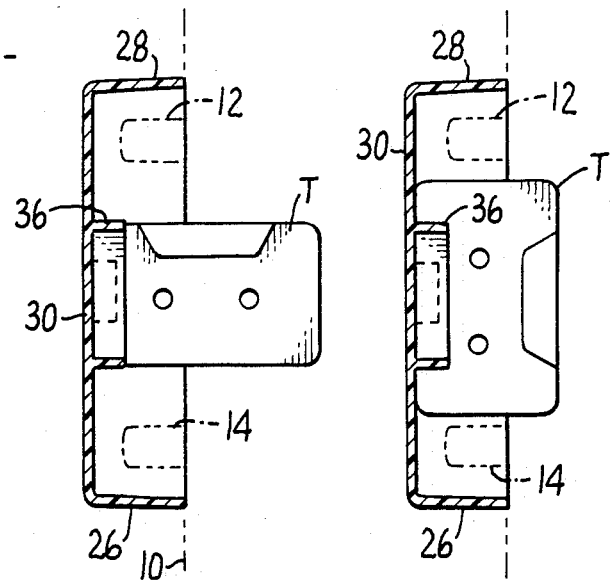
FIG. 1.
FIG. 2.
FIG. 3.
FIG. 4.
FIG. 5.   FIG. 6.

4,584,717

COVER FOR AN AUTOMOBILE RADIO ASSEMBLY

This application is a continuation, of application Ser. No. 363,600, filed Mar. 30, 1982, now abandoned.

BACKGROUND OF THE INVENTION

This invention relates to a cover or enclosure for the exterior portion of an automobile radio assembly that is exposed on the dashboard of an automobile so that inspection of the vehicle while parked would indicate that it has no radio.

Automobile radios are rather expensive items and occasionally are removed from the automobile by thieves. In recent years since stereo tape decks have been included in the radio assembly of automobiles thievery occurs far more frequently. The tape decks are much more expensive additions to the automobile radio assembly and thus represent a far greater problem to the owner of the auto.

The present invention has for its principal object the reduction of tape deck theft from automobile radio assemblies by providing a closure of relatively rigid material adapted to fit over the visible portion of an auto radio assembly on a dashboard, or at least over the portion thereof enclosing the tape deck, and to lock in place in such tight relationship with the dashboard or area where the radio is mounted so as to conceal the radio, and particularly the tape deck, so that on relatively close inspection a thief would observe no more than a blank panel resembling that used when there is no radio in the vehicle. A more complete understanding of the enclosure means can be had by reference to the accompanying drawing and the detailed description which follows.

DESCRIPTON OF THE PRIOR ART

The prior art has used casings to enclose the auto radio assembly. One form has relied on an offset along the outer edge of the cover to correspond to the edges of the radio assembly and frictionally engage them. This has not been satisfactory because such connections are not tight and are easily disengaged. Also, they require exact correspondence in dimension. Efforts to overcome the latter problem have not been satisfactory because they have used very flimsy materials, with or without false designs on them to cover the tape deck, and in the effort to stretch them to the required dimension they easily tear and become deformed to the point that they are not useful.

Another form of the prior art uses a rigid casing which covers the radio assembly. In this form the cover is frictionally engaged to a corresponding special faceplate which is, in turn, attached to the radio assembly by screws or other fastening means, replacing the original radio faceplate. This has not been satisfactory for various reasons. First, it requires assembly, because the existing radio assembly faceplate must be removed and replaced with the faceplate of the cover device. Second, the front of the radio assembly must be compatible to the faceplate of the cover. Third, having been replaced, the original faceplate is not visible while the radio or tape is playing; the replacement faceplate is unattractive and contains no prestigious brand names. The essential feature of the present invention is the use of a tape or similar object to engage the cover device, and thus satisfies all of the flaws of the prior art.

DESCRIPTION OF THE DRAWINGS

In the drawings:

FIG. 1 is a perspective view of the closure of the invention looking toward its interior and showing fastening means with a portion thereof in dotted lines, a preferred form of locking tab and a broken away portion of an auto dashboard showing the face of the radio including the tape deck, with its control dials;

FIG. 2 is a view of the same broken away portion of the dashboard showing the normally exposed portion of the automobile radio assembly as shown in FIG. 1 with the linking tab in place and the closure means fitting snugly against the dashboard;

FIG. 3 is a side view in elevation looking directly into the interior of the closure means;

FIG. 4 is a sectional view taken along line 4—4 of FIG. 3 and looking in the direction of the arrows;

FIG. 5 is a similar view taken along the lines 5—5 of FIG. 2 with the linking tab in place and showing the closure at right angles to that of FIG. 4;

FIG. 6 is a similar view to that of FIG. 5 with the linking tab at right angles to the position shown in FIG. 5.

DETAILED DESCRIPTION OF THE INVENTION

Referring now to FIG. 1 of the drawings showing the automobile radio assembly as emplaced within the broken away portion of dashboard 10. A typical radio R having an opening 17 for insertion of a tape, actuation and volume control knob 12, tuning knob 14, and a calibrated dial face 16 for identifying the desired station when the radio is in operation. Tape deck opening 17 is of generally rectangular shape and cross-section and is adapted to receive a tape cassette. Button 18 for turning the tape deck on and off when a tape is emplaced for operation and knob 20 is for releasing the tape to enable it to be readily removed.

Casing C is the closure for the cover means. In its preferred form it is generally rectangular having a length, height and depth to conform to the exterior portion of radio assembly R. It includes top and bottom portions 22 and 24, end walls 26 and 28 and face 30. Advantageously it is of rigid and slightly yieldable material so that along the long walls comprising top 22 and bottom 24 there is a minor degree of yield or play.

Rigidly connected with the inside of wall 30 of casing C is the fastening means. In a useful form as shown in the drawings the fastening means include upper bracket 32 and lower bracket 34. These brackets are also of rigid and slightly yieldable material and desirably of the same material as the cover face, and in fact can usefully be made integral with it. Each of the fastening brackets may include perpendicularly disposed reinforcing ribs 36. Brackets 32 and 34 are spaced a distance apart approximating the width of linking tab T which will be described in more detail below.

The length of the face of at least one bracket of the fastening means should be sufficient to engage the tape for a substantial part of its width. The other face may be equally long, or may only be of a length to provide a firm anchoring means for the tab to enhance frictional engagement with the fastener. Further, the portion of the brackets extending from the wall should be sufficient to ensure tight engagement with the tab.

In a preferred embodiment of this invention locking tab T, or the so-called linking tab, is a typical tape cassette as used when the tape deck is in operation.

As will be apparent from the drawings, particularly FIGS. 4, 5, and 6, and as noted above, the tape is designed to rigidly fit between brackets 32 and 34 so that the two pieces can be assembled as shown in FIG. 2 as well as FIGS. 4, 5 and 6 and then emplaced as in the tape deck opening 17 to accommodate the tab for a sufficient distance to ensure that the casing C can fit snugly against the dashboard 10 to conceal at least the tape deck opening and preferably all other visible parts of the radio assembly on the dashboard.

It is to be understood that the tabs can be made of plastic, wood or other materials instead of the standard tapes as shown in the drawing. However, the tapes are preferred because they are always at hand and the tapes are of dimensions which readily fit into the tape deck opening of the auto radio assembly.

As used herein, the term "auto radio assembly" includes a tape deck and other parts used in conventional radios. Also, in another modification, the casing C can for purposes of economy be substantially reduced in size so that it would cover only the tape deck opening portion of the radio assembly.

Further, the fastening means as disclosed herein can be modified so long as it is sufficient to rigidly and frictionally engage the tab means to enable it to be firmly held while it is placed within the tape deck opening and to thus hold the outer casing in engagement for the purposes of the invention.

Further, the brackets will accommodate the tape cassette or other form of linking tab not only sidewise or frontwards as shown in FIGS. 5 and 6, respectively, but will also grasp the tab where it is emplaced in either a centered or off-center position depending on the location of the opening for the tape cassette in the radio assembly.

Although the preferred form of the invention has been described above and disclosed in the drawings, modifications thereof may be made within the scope of the appended claims.

I claim:

1. A casing for concealing a dashboard built-in tape deck assembly of an automobile radio, said casing having top, bottom and end walls and a front wall having an outer face, said walls being of a length, width and depth sufficient to enclose an exterior portion of said tape deck assembly of said automobile radio when said casing is mounted against the dashboard so as to cover said tape deck assembly, and said casing being sufficiently compact to be readily stored in flat fashion when not in use;

said front wall of said casing including an inner face having means thereon comprising a pair of parallel yieldable resilient walls with an open ended slot therebetween which extends a distance sufficient to insure tight engagement with an edge position of a tape cassette when inserted in the slot to releasably frictionally engage the edge portion of the tape cassette between said yieldable walls, another portion of said tape cassette extending outwardly a substantial extent from a back of the top, bottom and end walls such that said cassette can be engaged within the opening into said tape deck assembly to thereby releasably secure said casing against said dashboard to fit over and enclose said tape deck assembly.

* * * * *